US007720487B2

(12) United States Patent
Kim et al.

(10) Patent No.: US 7,720,487 B2
(45) Date of Patent: May 18, 2010

(54) HANDOVER METHOD AND APPARATUS FOR MOBILE TERMINAL USING LOCATION INFORMATION IN HETEROGENEOUS SYSTEM NETWORK

(75) Inventors: Won Ik Kim, Seoul (KR); Bong Ju Lee, Jeollabuk-do (KR); Pyeong Jung Song, Daejeon (KR); Sang Woo Nam, Daejeon (KR); Jae Su Song, Daejeon (KR); Yeon Seung Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 796 days.

(21) Appl. No.: 11/295,126

(22) Filed: Dec. 5, 2005

(65) Prior Publication Data

US 2006/0121914 A1    Jun. 8, 2006

(30) Foreign Application Priority Data

Dec. 7, 2004  (KR) ...................... 10-2004-0102288
Aug. 12, 2005 (KR) ...................... 10-2005-0074438

(51) Int. Cl.
*H04L 12/66* (2006.01)
(52) U.S. Cl. .................. 455/456.1; 455/67.11; 455/440
(58) Field of Classification Search ................. 370/328, 370/331, 332; 455/456.1, 445, 448, 456.6, 455/456.5, 435.1, 437, 436, 440, 435.2, 435.3, 455/438, 439, 442, 525, 67.11, 67.13
See application file for complete search history.

(56) References Cited

U.S. PATENT DOCUMENTS 6,748,217 B1 *  6/2004  Hunzinger et al. ....... 455/435.2
7,136,638 B2 *  11/2006 Wacker et al. ............. 455/424
7,161,914 B2 *  1/2007  Shoaib et al. ............... 370/331
7,257,411 B2 *  8/2007  Gwon et al. ............. 455/456.1

(Continued)

FOREIGN PATENT DOCUMENTS

KR    1020040058934 A    7/2004
KR    10-2005-0052172    6/2005

OTHER PUBLICATIONS

Wen-Tsuen Chen, "An Adaptive Scheme for Vertical Handoff in Wireless Overlay Networks", Dept. of Computer Science, Nat'l Tsing-Hua University, Proceedings of the Tenth Int'l Conference on Parallel and Distributed Systems (ICPADS'04) 1521-9097/04 (8 pp).

*Primary Examiner*—George Eng
*Assistant Examiner*—Brandon J Miller
(74) *Attorney, Agent, or Firm*—Blakely, Sokoloff, Taylor & Zafman LLP (57) ABSTRACT

A handover method and apparatus for a mobile terminal using location information in a network of heterogeneous systems are provided. The handover method uses service area map information provided by a location service server in a mobile communication network in which at least one or more heterogeneous wireless network systems are connected through a predetermined network and, includes: receiving service area map information transmitted from the location service server; the mobile terminal determining whether or not the location of the mobile terminal is within the service area map; and if it is determined that the mobile terminal is within the service area map, the wireless terminal selecting an accessible wireless network system and then activating a unit for communicating with a base station of the selected wireless network system. According to the method, a battery consumption problem that occurs by activating all modems when a wireless terminal, which is connected to a predetermined mobile communication system in an environment where a plurality of heterogeneous systems are overlapping each other, is searching for candidate systems in order to perform handover to a heterogeneous network, can be solved. Also, a problem where finding a candidate system is time-consuming can be solved.

13 Claims, 9 Drawing Sheets

U.S. PATENT DOCUMENTS

| | | | |
|---|---|---|---|
| 7,313,628 B2 * | 12/2007 | Chaskar et al. | 709/238 |
| 2003/0048762 A1 * | 3/2003 | Wu et al. | 370/328 |
| 2003/0148777 A1 * | 8/2003 | Watanabe et al. | 455/458 |
| 2003/0220116 A1 * | 11/2003 | Sagefalk et al. | 455/456.1 |

* cited by examiner

HANDOVER METHOD AND APPARATUS FOR MOBILE TERMINAL USING LOCATION INFORMATION IN HETEROGENEOUS SYSTEM NETWORK

CROSS-REFERENCE TO RELATED PATENT APPLICATIONS

This application claims the benefit of Korean Patent Application Nos. 10-2004-0102288, filed on Dec. 7, 2004 and 10-2005-0074438, filed on Aug. 12, 2005, in the Korean Intellectual Property Office, the disclosures of which are incorporated herein in their entirety by reference.

BACKGROUND OF THE INVENTION

1. Field of the Invention

The present invention relates to a method by which a multi mode mobile terminal (hereinafter referred to as a "wireless terminal") that can access at least one or more of heterogeneous mobile communication systems detects a candidate system that can be accessed from a current location and performs handover, and a location service server (LCS) therefor. More specifically, the present invention relates to a method of providing and obtaining information by a multi mode terminal, an operation method of a location service server, and an apparatus therefor, by which battery consumption, which occurs when a wireless terminal that can access a plurality of mobile communication systems activates multi-standard modems in the wireless terminal in order to detect candidate systems when performing handover between heterogeneous networks, can be prevented, and a time taken for detecting candidate systems can be reduced.

2. Description of the Related Art

In beyond 3rd generation (B3G) and 4th generation (4G) mobile communication structures, one of the most important research topics is to implement seamless connection in an optimum system with respect to the current environment of a service subscriber through interoperation when services areas of mobile communication systems having different characteristics are overlapping each other.

For this handover between heterogeneous networks, a wireless terminal needs to detect a candidate system in addition to a system to which the wireless terminal is currently connected.

The methods of detecting candidate systems by a wireless terminal can be divided roughly into two methods. The first method detects a candidate system by activating all modems in the wireless terminal or activating the modems periodically. The second method detects a candidate system with respect to the location of a wireless terminal or a wireless access base station.

In the first method, candidate systems are detected continuously by activating continuously all multi-standard modems in a wireless terminal. However, in this case, the battery consumption of the wireless terminal increases because all modems are activated.

In another case of the first method, candidate systems are detected by activating and inactivating multi-standard modems in the wireless terminal periodically. In this case, the battery consumption can be reduced (though the battery consumption problem still exists), but there still is a problem in that the time taken for detecting candidate systems increases because modems are periodically activated and/or inactivated.

In particular, if the wireless terminal is a software defined radio (SDR)-based terminal, instead of using the multi-standard modems, one modem is reconfigured by software to perform mode conversion and any conventional technologies falling within the first method cannot be used basically. Accordingly, a method by which an SDR terminal can detect a candidate system is needed.

In the second method of detecting a candidate system, the location of a wireless terminal has to be estimated. This can be done by Cell-ID, enhanced observed time difference (E-OTD), observed timed difference of arrival (OTDOA), and assisted global positioning system (A-GPS, hereinafter referred to as "GPS").

Generally the distance between a wireless terminal and a wireless access base station is estimated by using a location tracking technology, and a candidate system is selected based on the distance. More specifically, if a wireless terminal is located within a theoretical service area of a predetermined wireless access base station, that is, if the distance between the wireless terminal and the wireless access base station is small, the wireless terminal selects the corresponding system as a candidate system.

Theoretically, assuming that there are no obstacles in a propagation environment, a higher signal intensity can be obtained by decreasing the distance between a terminal among a plurality of mobile communication terminals and the wireless access base station. However, in an area having many elements in the propagation environment, such as a city center, the accuracy of estimating a signal intensity with respect to the distance between the terminal and the wireless access base station is not guaranteed. Accordingly, in the city central area where service areas of mobile communication systems having different characteristics are overlapping each other, there is a problem in that selection of a candidate system with respect to the distance between a terminal and a wireless access base station may not be reliable.

SUMMARY OF THE INVENTION

The present invention provides a method and apparatus by which a candidate system is selected based on a signal intensity of a close base station with respect to the location of a wireless terminal when the wireless terminal, which is connected to a predetermined mobile communication system in an environment where a plurality of heterogeneous systems are overlapping each other, is searching for candidate systems in order to perform handover to a heterogeneous network.

According to an aspect of the present invention, there is provided a method of providing location information by a wireless terminal in a mobile communication network in which at least one or more heterogeneous wireless network systems are connected to each other through a predetermined network, the method including: detecting a wireless network system to which a connection is tried to be established on the basis of the intensities of signals received from the base stations of the wireless network systems; generating a message providing location information, including the location information of the wireless terminal, obtained based on information provided by a location recognition system; and transmitting the message providing the location information to a location service server located in a common core network through the detected wireless network system.

According to another aspect of the present invention, there is provided a method of building a service area map of a location service server by using location information of a wireless terminal in a mobile communication network in which at least one or more heterogeneous wireless network systems are connected to each other through a predetermined network, the method including: forming a map in relation to each of the wireless network systems; receiving a message from the wireless terminal providing location information, including the location information of the wireless terminal, and the intensity value of a signal received from the base station of an accessible wireless network system; and selecting a reference point closest to the location of the wireless terminal in relation to each of the wireless network systems, based on the location information of the wireless terminal, and storing the intensity value of the signal in a location corresponding to the selected reference point.

According to still another aspect of the present invention, there is provided a handover method for a mobile terminal by using service area map information provided by a location service server in a mobile communication network in which at least one or more heterogeneous wireless network systems are connected through a predetermined network, the method including: receiving service area map information transmitted from the location service server; the mobile terminal determining whether or not the location of the mobile terminal is within the service area map; and if it is determined that the mobile terminal is within the service area map, the wireless terminal selecting an accessible wireless network system and then activating a unit for communicating with a base station of the selected wireless network system.

According to yet still another aspect of the present invention, there is provided a wireless terminal including: a message generation unit receiving inputs of the signal intensities and location information received from base stations of at least one or more heterogeneous wireless network systems, and generating a message providing location information with an identifier of an accessible wireless network system; and a modem selection unit activating a modem for a base station of an accessible wireless network system according to wireless network system information provided by a location service server.

According to a further aspect of the present invention, there is provided a location service server including: a map storage unit generating and storing a grid-shape map in relation to each of wireless network systems forming a mobile communication network; a reference point selection unit receiving from a wireless terminal, a message providing the location information from the wireless terminal, including the location information of the wireless terminal, an identifier of an accessible wireless network system, and the intensity of a signal received from a base station, searching the map storage unit, and selecting a reference point close to the location of the location information of the wireless terminal; and a signal intensity recording unit recording the signal intensity value at the selected reference point, of the base station of each of the wireless network systems.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The present invention uses a location estimation technology for calculating an accurate location, such as a GPS method. Also, at a location where a GPS signal cannot be received, all location estimation technologies can be used.

Figure 1:
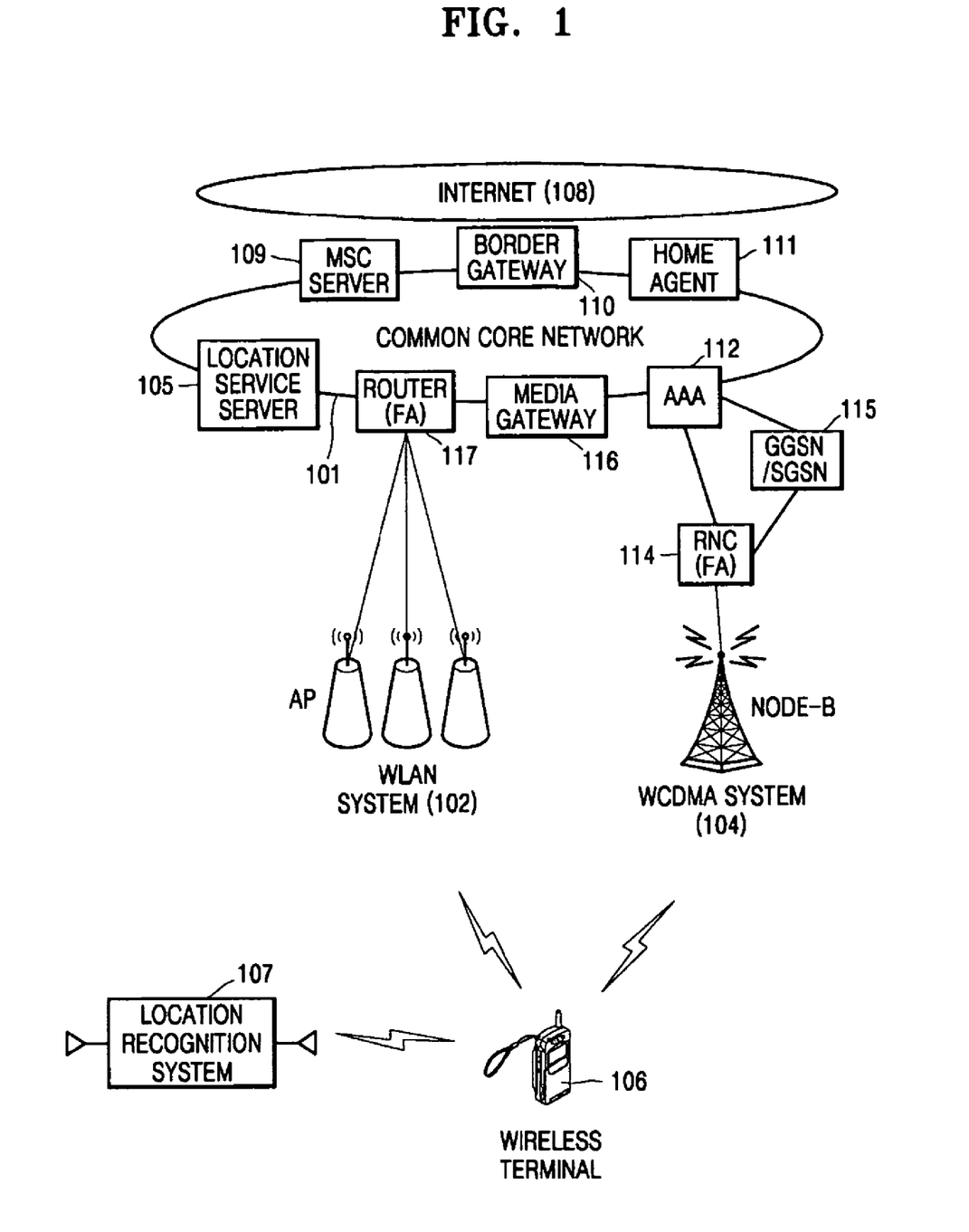
FIG. 1 illustrates an example of implementing a network including IP-based heterogeneous wireless network systems to which a wireless terminal and a location service server according to the present invention are applied.

FIG. 1 shows a wireless local area network (WLAN) system 102 and a wideband code division multiple access (WCDMA) system 104, as an example of a diagram of the structure of an interoperation network including IP-based heterogeneous wireless network systems to which the present invention is applied.

Elements of an interoperation network including IP-based heterogeneous wireless network systems will now be explained briefly.

A mobile switching center (MSC) server 109, a gateway general packet radio service (GPRS) support node (GGSN)/serving GPRS support node (SGSN) 115, and a radio network controller (RNC) 114 are access nodes forming a 3G wireless access network and a core network.

A border gateway 110 is a gateway to access the Internet from a common core network 101 unifying the 3G network and the WLAN network. A home agent (HA) 111 is a virtual router on a home network of a subscriber, used in a mobile IP protocol. This plays a role of maintaining current location information of the subscriber. An authentication, authorization, and accounting (AAA) unit 112 performs authentication of a subscriber and security functions in each system or in interoperation between systems. A media gateway (MG) 113 is a connection point between the WCDMA access network and the common core network 101.

A router 117 has an embedded foreign agent (FA) function in the WLAN system 102 and serves for accessing the common core network 101.

In the common core network 101, these heterogeneous systems are interoperable and connected to each other. A location service server (LCS server) 105 is disposed in the common core network 101. The location service server 105 stores a map for each system, the structure of which will be explained later.

A wireless terminal 106 can access all mobile communication systems 102 and 104 connected to the one common core network 101. The wireless terminal 106 can obtain information on its location through a location recognition system (for example, a GPS satellite) 107, or other location recognition technologies described above.

Figure 2:
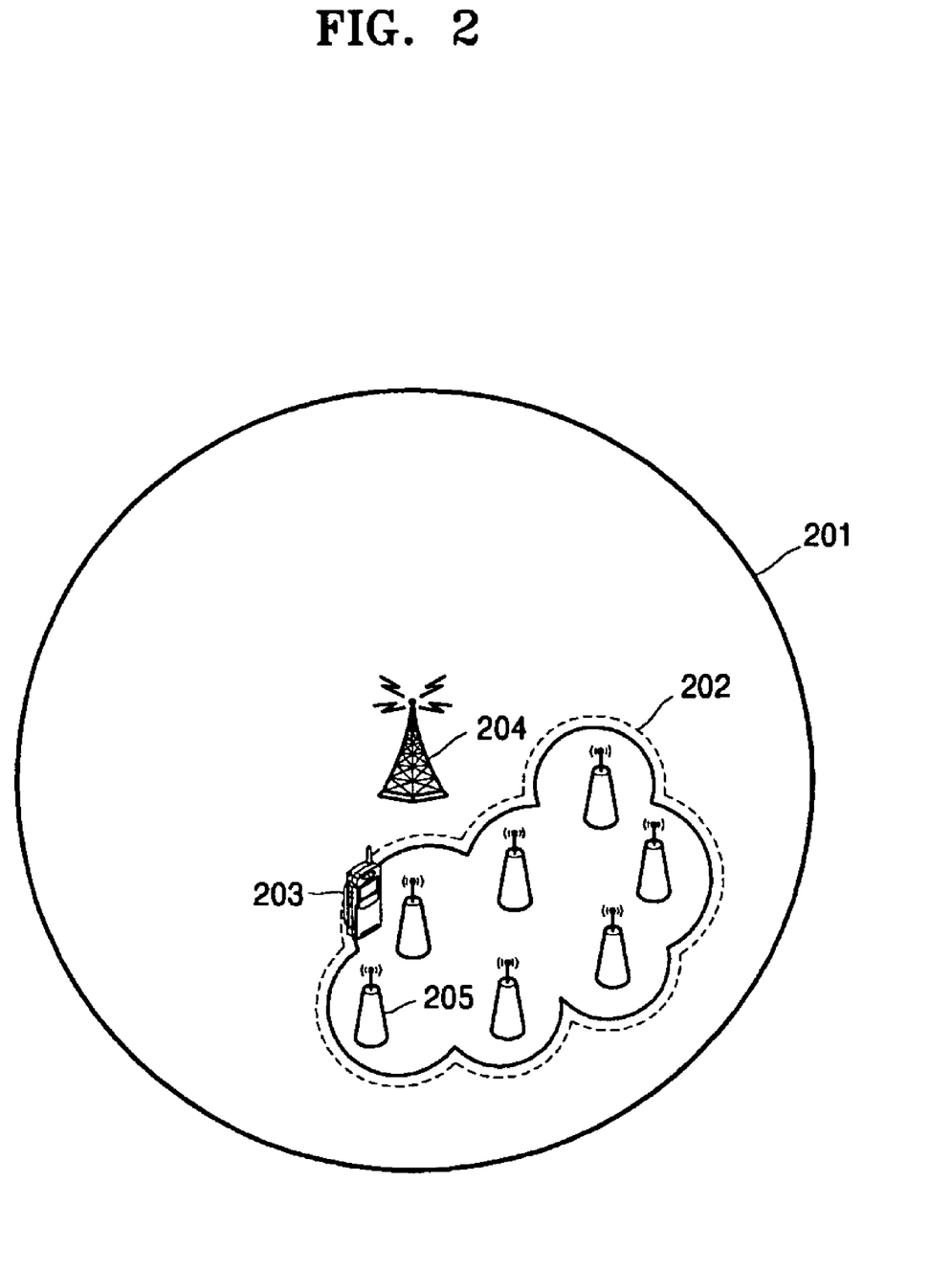
FIG. 2 is a schematic diagram showing the theoretical propagation range of each system included in an interoperation structure including the heterogeneous wireless network systems of FIG. 1.

FIG. 2 is a schematic diagram showing the theoretical propagation range of each system included in the interoperation structure including heterogeneous wireless network systems of FIG. 1. Referring to FIG. 2, for interoperation of respective heterogeneous wireless networks; it is assumed that.

Construction of the common core network 101 that can be accessed commonly by respective heterogeneous wireless networks in order to interoperate with each other is known.

The location service server 105 in the common core network 101 known.

The location service server 105 keeps the service area map for each of heterogeneous wireless network systems interoperating with each other.

The wireless terminal 106 can access all heterogeneous wireless network system connected to the one common core network 101.

That the wireless terminal 106 can detect its location information from the location recognition system (for example, a GPS satellite, or other location tracking technologies can be included) 107.

The two wireless network systems 201 and 202 having different propagation ranges are overlapping with each other.

As described above, the service areas of different types of wireless network systems 201 and 202 having different propagation ranges are overlapping with each other. That is, reference numbers 201 and 202 showing different propagation ranges, shown in FIG. 2, indicate the propagation service areas of wireless network systems (especially, base stations), and the wireless terminal 203 indicates that it can access a plurality of wireless network systems.

Figure 3:
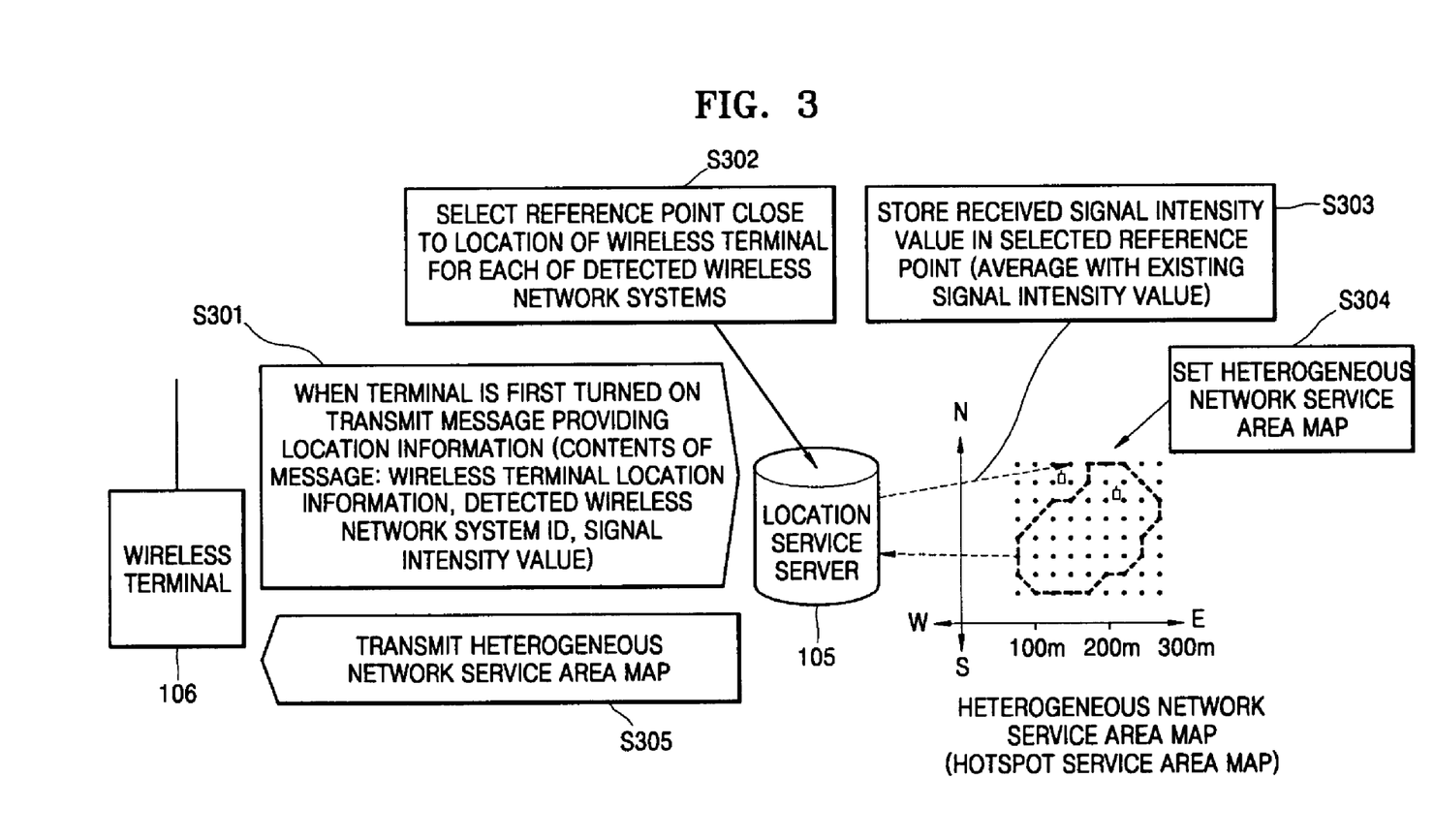
FIG. 3 illustrates an embodiment of initial-stage construction of a location service server and detection of a heterogeneous wireless network system of a wireless terminal by the location service server according to the present invention.

Referring to FIG. 3, initial-stage construction of the location service server 105 by the wireless terminal 106 which is turned on in the wireless network system as shown in FIGS. 1 and 2, and reception of heterogeneous network service area map information from the location service server 105, by the wireless terminal 106 capable of performing handover, will now be explained.

FIG. 3 illustrates an embodiment of initial-stage construction of a location service server and detection of a heterogeneous wireless network system of a wireless terminal by the location service server according to the present invention. Referring to FIG. 3, if the wireless terminal 106 is first turned on, the wireless terminal 106 first transmits a message providing location information to the location service server 105 in operation S301. Here, the information included in the message providing location information includes location information of the wireless terminal 106, a detected wireless network system identifier (ID), and a signal intensity value of a base station.

Next, the location service server 105 selects a reference point close to the wireless terminal 106 for each of detected wireless network systems in operation S302.

Next, the location service server 105 stores the signal intensity value received in operation S301 in the reference point selected in operation S302. Here, if an existing signal intensity value is already stored in the selected reference point, the average value of the existing signal intensity value and the received signal intensity value are obtained and stored, thereby replacing the existing value.

Next, by repeating the operations S301 through S303, the location service server sets a heterogeneous network service area map in operation S304. Here, a hotspot service area map can be given as an example of the heterogeneous network service area map. Next, the location service server 105 transmits the heterogeneous network service area map set in operation S304 to the wireless terminal 106 in operation S305.

Figure 4:
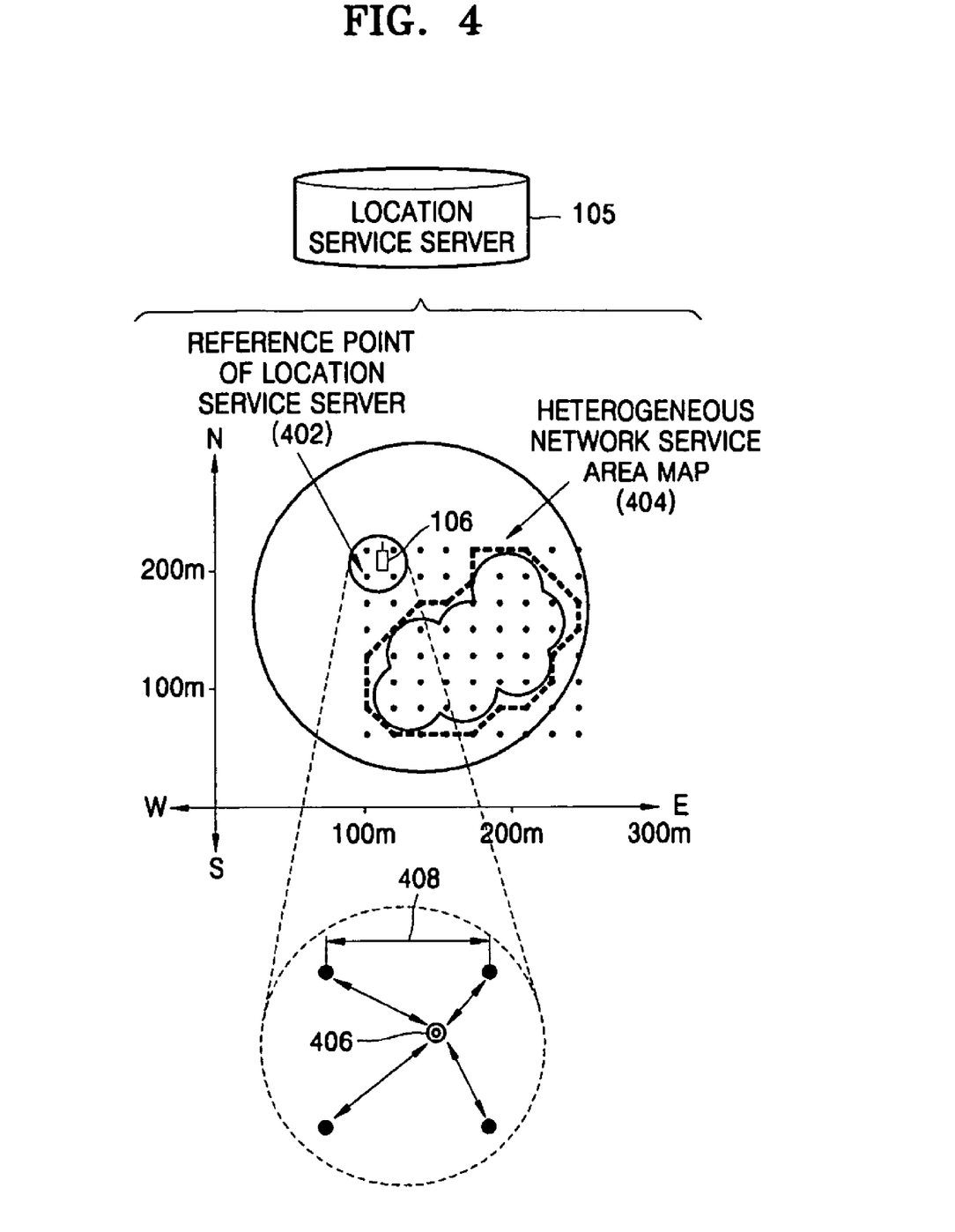
FIG. 4 illustrates an example of forming a heterogeneous network service area map in a location service server according to the present invention.

FIG. 4 illustrates an example of forming a heterogeneous network service area map in a location service server according to the present invention.

The location service server 105 receives a message providing location information, including location information of the wireless terminal 106, the ID of a currently connected wireless network system, and a signal intensity value of a base station, from the wireless terminal 106 which is turned on. The location service server 105 finds a currently closest reference point (reference location) 402 of the location service server through the location information of the wireless terminal 106, and stores the message providing location information transmitted by the wireless terminal 106.

Here, the interval between reference points in the map of the location service server 105 may become less or small according to the propagation radius and characteristic of a wireless network system. For example, in case of a micro system, the interval 408 between reference points becomes large, and in case of a pico system having a smaller radius of a service area, the interval 408 between reference points becomes smaller than that of the micro system. This may vary with respect to the capacity and processing speed of the location service server 105.

Figure 5:
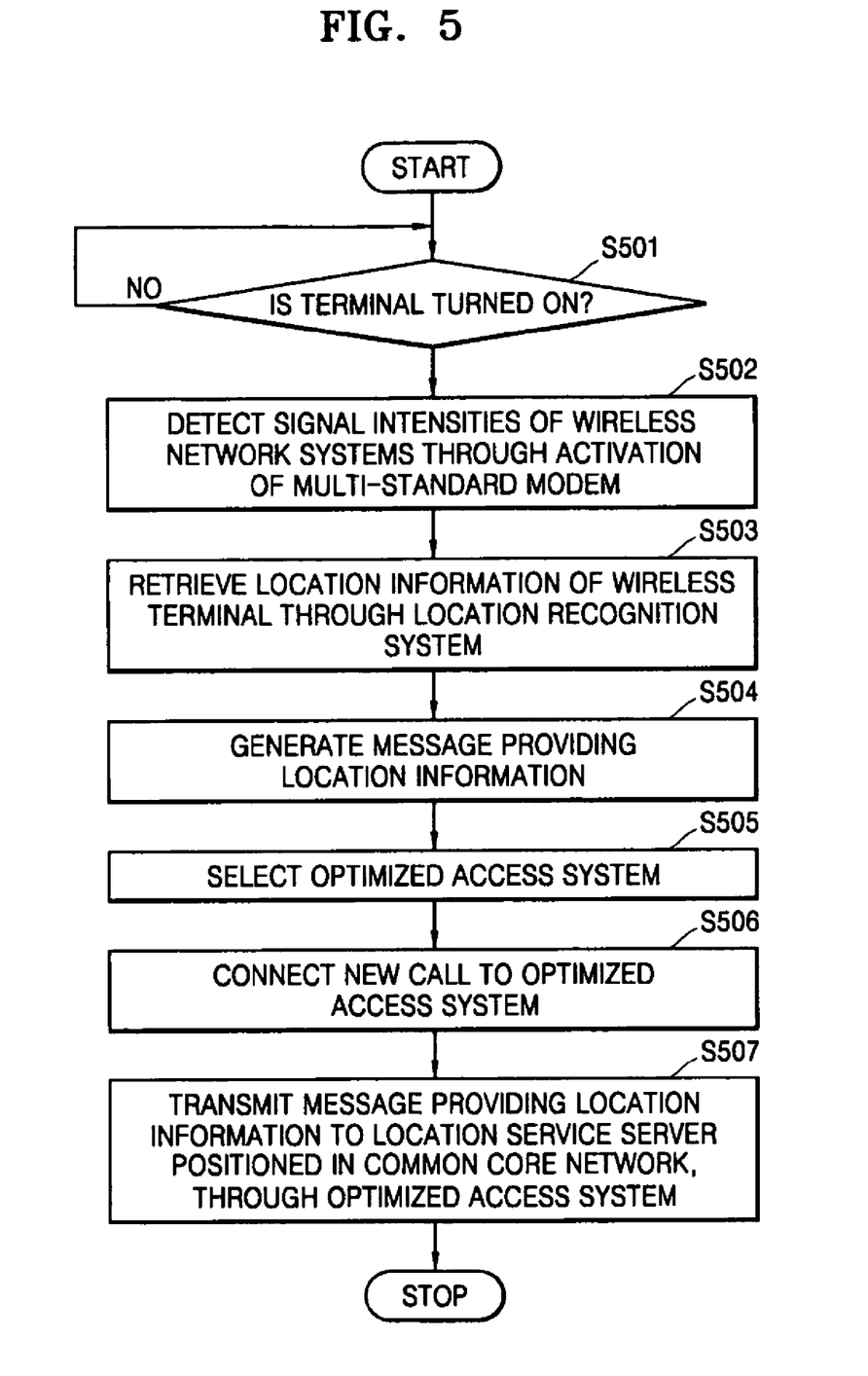
FIG. 5 is a flowchart of a process of providing location and signal information to a location service server by a wireless terminal according to the present invention.

FIG. 5 is a flowchart of a process of providing location and signal information to a location service server by a wireless terminal according to the present invention. The operations in FIG. 5 are performed by the wireless terminal 106. Here, it is assumed that the wireless terminal 106 is a multi-mode wireless terminal that can access all heterogeneous wireless network systems connected to the one common core network 101.

Referring to FIG. 5, first, the wireless terminal 106 activates all multi-standard modems inside the wireless terminal 106, by applying initial power in operation S501.

Next, the intensities of signals received from wireless network systems (for example, 102 and 104 of FIG. 1) that can be accessed through the activation of the multi-standard modems are detected and the IDs of the detected wireless network systems are detected in operation S502.

Next, the wireless terminal 106 detects its location information through the location recognition system 107 implemented by a GPS or the like in operation S503.

Next, the wireless terminal 106 generates a message providing location information, by using the IDs of the wireless network systems and the intensities of the received signals detected in operation S502, and the location information detected in operation S503, in operation S504.

Next, the wireless terminal 106 selects an optimized access system among the candidate systems detected by using the information obtained through activating the multi-standard modems, on the basis of the intensities of the received signals in operation S505.

Next, the wireless terminal 106 initiates a new call to the optimized access system selected in operation S505, in operation S506.

Next, the message providing the location information generated in operation S504 is transmitted through the optimized access system to the location service server located in the common core network in operation S507.

Figure 6:
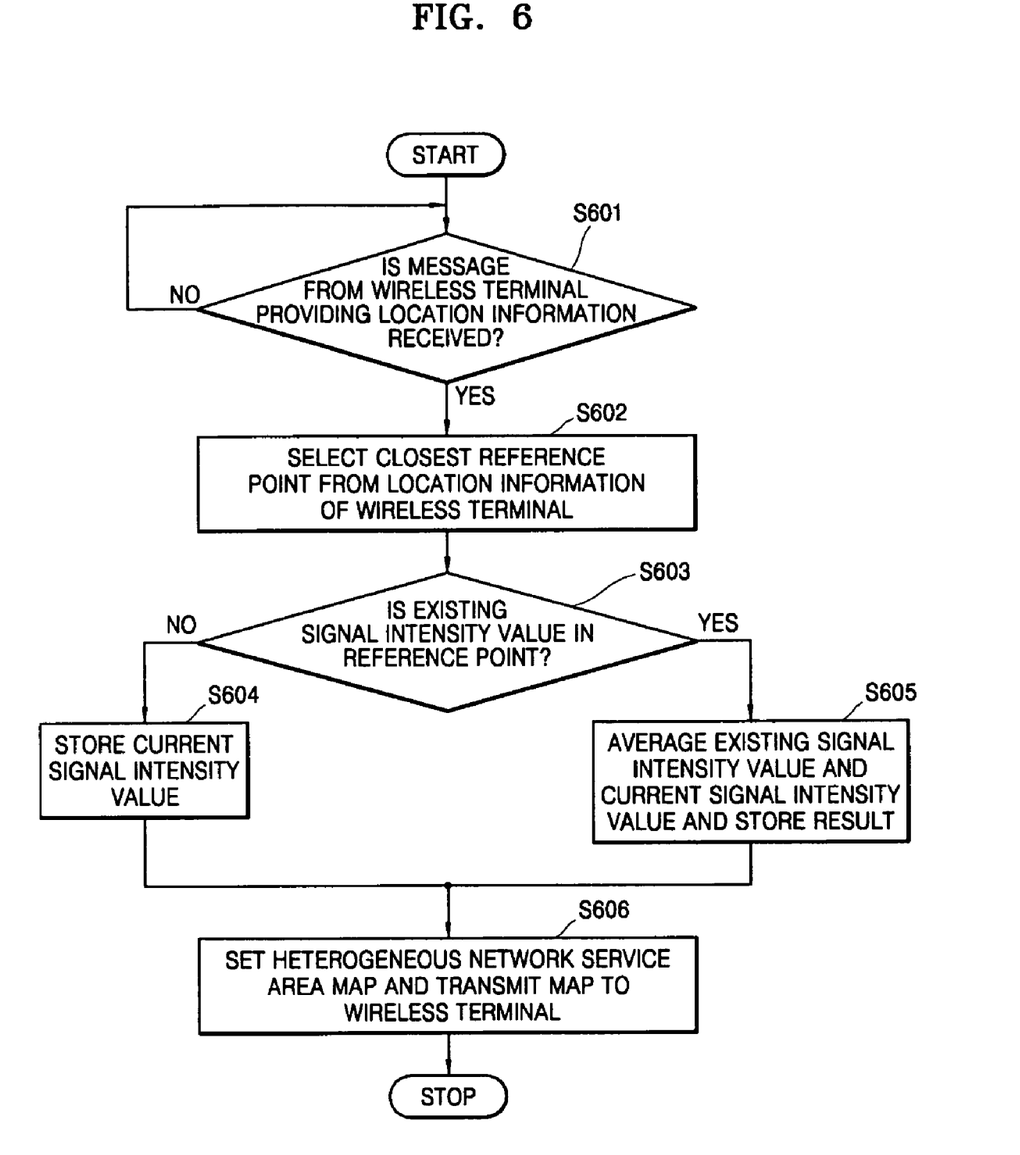
FIG. 6 is a flowchart of a process of initial-stage construction by a location service server based on information provided by a wireless terminal according to the present invention.

FIG. 6 is a flowchart of a process of initial-stage construction by a location service server based on information provided by a wireless terminal according to the present invention. The operations of FIG. 6 are performed by the location service server 105. It is assumed that the wireless terminal 106 in FIG. 6 is a multi-mode wireless terminal that can access all heterogeneous wireless network systems connected to the one common core network 101.

Referring to FIG. 6, first, the location service server 105 determines whether or not a message providing location information from the wireless terminal 106 is received in operation S601. If the result of the determination in operation S601 indicates that the message providing location information is not received, operation S601 is repeatedly performed. Meanwhile, if the result of the determination in operation S601 indicates that the message providing location information is received, operation S602 is performed. Here, as described above with reference to FIG. 5, the message providing location information is formed with the IDs of the wireless network systems and the intensities of the received signals detected in operation S502, and the location information detected in operation S503.

Next, the location service server 105 receiving the message providing location information in operation S601 selects a closest reference point in the already set map for each wireless network system, by using the location information of the wireless terminal 106 that is information included in the message providing the location information, in operation S602. At this time, the interval with the reference point in the map already set in the location service server 105 with respect to the location information of the wireless terminal 106 may become wide or narrow according to the propagation radius and characteristic of a wireless network system. This may vary with respect to the capacity and processing speed of the location service server 105.

Next, the location service server 105 determines whether or not signal of a predetermined intensity value is in the reference point detected in operation S602, in operation S603. If the result of determination in operation S603 indicates that there is no signal of a predetermined intensity in the reference point, operation S604 is performed to store the current signal intensity value. If the result of determination in operation S603 indicates that there exists a signal of a predetermined intensity value in the reference point, operation S605 is performed to average the current signal intensity value and the signal of a predetermined intensity value, and then to store the average value. After operations S604 and S605, the location service server 105 sets a heterogeneous network service area map and transmits this to each wireless terminal 106 in operation S606.

Figure 7:
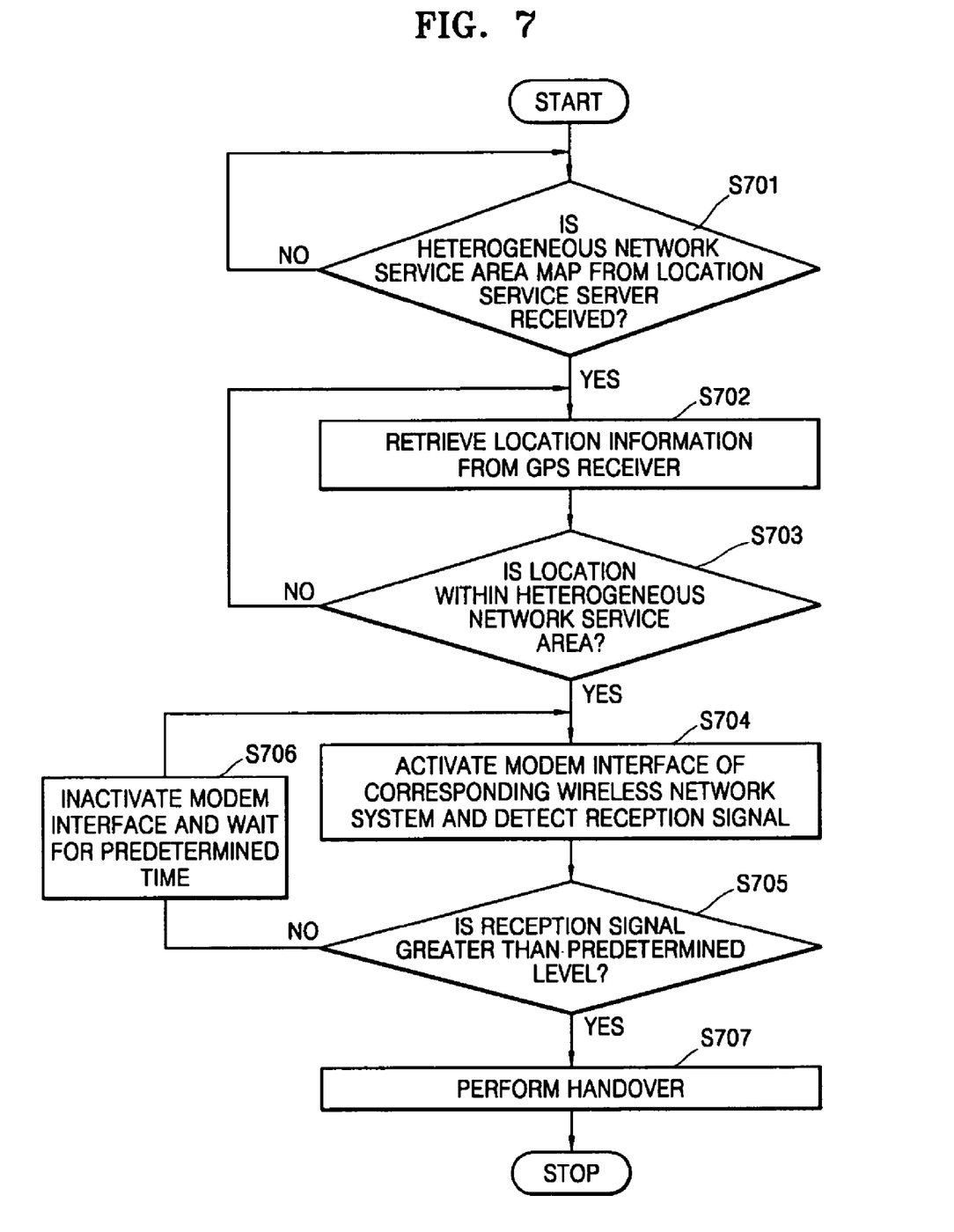
FIG. 7 is a flowchart showing a process in which a wireless terminal according to the present invention performs handover between heterogeneous systems by detecting an accessible candidate system.

FIG. 7 is a flowchart showing a process in which a wireless terminal according to the present invention performs handover by detecting an accessible candidate system between heterogeneous systems. The operations of FIG. 7 are performed by the wireless terminal 106. Here, it is assumed that the wireless terminal 106 is a multi-mode wireless terminal that can access all heterogeneous wireless network systems connected to the one common core network 101.

Referring to FIG. 7, first, in order to detect candidate systems that can be accessed when handover between heterogeneous wireless network systems is performed, the wireless terminal 106 (or an SDR terminal) determines whether or not heterogeneous network service area map information from the location service server 105 is received in operation S701. If the determination result of operation S701 indicates that the heterogeneous network service area map information cannot be received, operation S701 is performed again. Meanwhile, if the determination result of operation S701 indicates that the heterogeneous network service area map is received, operation S702 is performed.

In operation S702, the wireless terminal 106 retrieves information on the location of the wireless terminal 106 through the location recognition system 107 implemented as a GPS or the like.

Next, by continuously comparing the heterogeneous network service area map information received in operation S701 with the location information of the wireless terminal 106 retrieved in real time in operation S702, the wireless terminal 106 determines whether or not the wireless terminal 106 itself is located in the heterogeneous network service area in operation S703. If the determination result of operation S703 indicates that the wireless terminal 106 is not in the heterogeneous network service area, operation S702 is performed again. Meanwhile, if the determination result of operation S703 indicates that the wireless terminal 106 is in the heterogeneous network service area, operation S704 is performed.

In operation S704, the wireless terminal 106 activates the modem interface of the corresponding wireless network system, and the wireless terminal detects a reception signal.

Next, it is determined whether or not the intensity of the reception signal detected in operation S704 is equal to or greater than a predetermined magnitude in operation S706. Here, by determining whether or not the intensity is equal to or greater than the predetermined magnitude, it is determined whether or not the intensity is equal to or greater than a handover acceptable threshold (A-TH). If the result of determination in operation S705 indicates that the intensity of the reception signal is less than the predetermined magnitude, operation S706 is performed to inactivate the modem interface and, after waiting for a predetermined time, operation S704 is performed again. Meanwhile if the result of determination in operation S705 indicates that the intensity of the reception signal is equal to or greater than the predetermined magnitude, handover to the corresponding wireless network system is performed in operation S707.

The structures of a wireless terminal and a location service server according to the present invention will now be explained. In order to avoid a redundant explanation, the explanation will focus on the structural characteristics.

Figure 8:
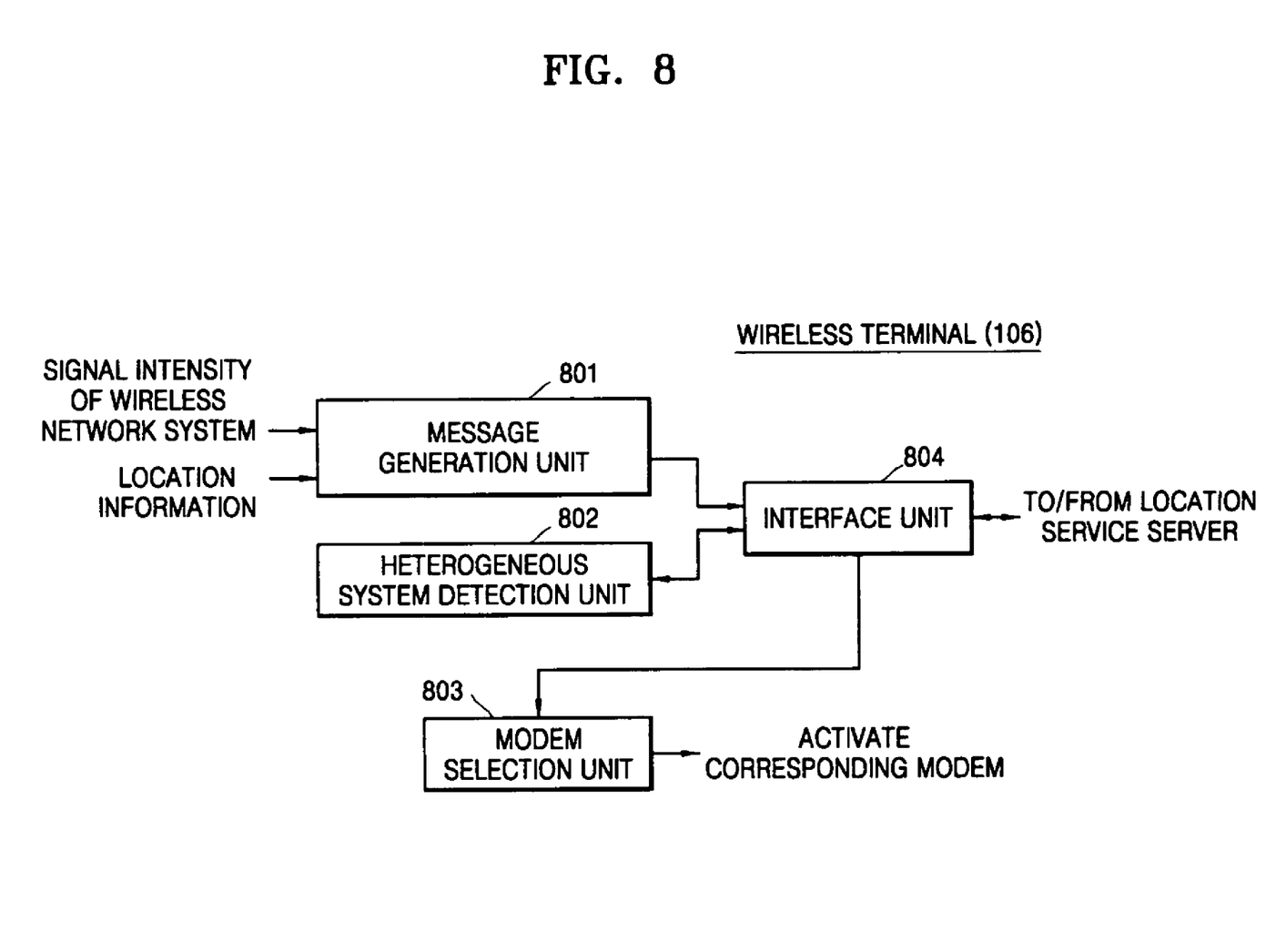
FIG. 8 is a block diagram showing the structure of a wireless terminal according to the present invention.

FIG. 8 is a block diagram showing the structure of a wireless terminal according to the present invention. Referring to FIG. 8, the wireless terminal 106 includes a message generation unit 801, a heterogeneous detection unit 802, a modem selection unit 803, and an interface unit 804.

The message generation unit 801 receives inputs of the intensities of signals and location information received from the base stations of the heterogeneous wireless network system connected to the network as shown in FIG. 1, and generates a message providing location information together with the IDs of wireless network systems that the wireless terminal 106 can access, on the basis of the intensity of a signal.

The heterogeneous system detection unit 802 plays a role of detecting a heterogeneous wireless network system, by using the location information of the wireless terminal 106 and ideal service area map information received from the location service server 105 when the wireless terminal 106 performs communication. The interface unit 804 performs wireless interfacing between the message generation unit 801 and the base station. Its ultimate access object is the location service server 105, and the interface unit 804 transmits the message providing location information generated in the message generation unit 801 and receives the heterogeneous network service area map generated in the location service server 105.

The modem selection unit 803 activates a modem for communication with the base station of a wireless network system that can be accessed, according to the system information, that is, more specifically, the intensity of a signal, provided by the location service server 105, and by doing so, restricts the operation of a modem that is unnecessary when handover of the wireless terminal 106 is performed.

Figure 9:
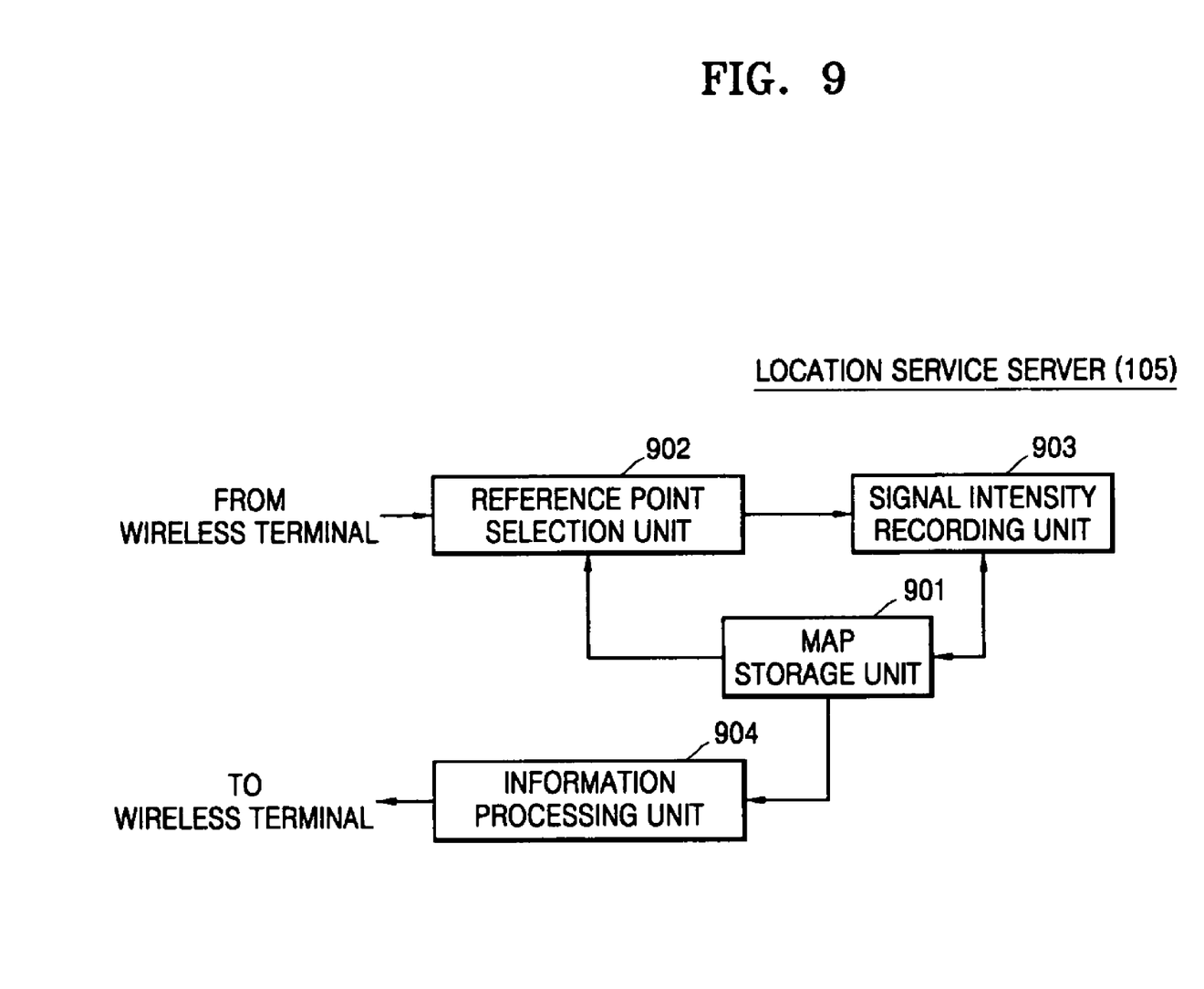
FIG. 9 is a block diagram showing the structure of a location service server according to the present invention.

FIG. 9 is a block diagram showing the structure of a location service server according to the present invention. Referring to FIG. 9, the location service server 105 includes a map storage unit 901, a reference point selection unit 902, a signal intensity recording unit 903, and an information processing unit 904.

The map storage unit 901 generates and stores a grid-shape map, as shown in FIG. 4, for each of the heterogeneous wireless network systems forming a mobile communication network.

The reference point selection unit 902 receives a message providing location information, including the location information of the wireless terminal 106, the IDs of wireless network systems that can be accessed and the intensity of a signal received from a base station, from the wireless terminal 106, and by searching the map storage unit 901, selects a reference point close to the location of the wireless terminal 106 as described above with reference to FIG. 4.

The signal intensity recording unit 903 records the signal intensity at the selected reference point, of a base station for each of the wireless network systems.

The information processing unit 904 transmits service area map information stored in the map storage unit 901 to the wireless terminal 106.

The method of providing location information of a wireless terminal, the method of building service area map information of a location service server, and the method of performing handover by a wireless terminal according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, the font ROM data structure according to the present invention can be implemented as computer readable codes on a recording medium such as ROM, RAM, CD-ROMs, magnetic tapes, floppy disks, flash memory, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of building a service area map of a location service server by using location information of a wireless terminal in a mobile communication network in which at least two heterogeneous wireless network systems are connected to each other through a predetermined network, the method comprising:

forming a network service area map in relation to each of the wireless network systems;

receiving from the wireless terminal a message providing location information of the wireless terminal, intensity values of signals received from base stations of accessible wireless network systems and an identification of the accessible wireless network systems through a wireless network system selected from among the accessible wireless network systems on the basis of the intensities of signals of the accessible wireless network systems;

selecting a reference point closest to the location of the wireless terminal in relation to each of the wireless network systems, based on the location information of the wireless terminal, and storing the intensity value of the signal in a location corresponding to the selected reference point;

detecting whether or not an already stored signal intensity value exists in relation to the selected reference point;

if the detection result indicates that the already stored signal intensity value does not exist, storing the intensity value of the signal in the message providing the location information; and if the detection result indicates that the already stored signal intensity value exists, obtaining the average value between the already stored signal intensity value and the signal intensity value in the message providing the location information, and storing the average value.

2. The method of claim 1, wherein in the forming of the network service area map, the map is formed by generating a grid shape on a 2-dimensional plane in which the wireless network systems have predetermined intervals respectively in each direction, and selecting the position of each wireless network system as a reference point.

3. The method of claim 2, wherein the network service area map has an interval between the reference points that varies according to the characteristic of each system forming the mobile communication network.

4. The method of claim 1, further comprising:

transmitting the service area map of the wireless network systems set by storing the signal intensity value, to the wireless terminal.

5. The method of claim 1, wherein the message providing the location information further includes an identifier of an accessible wireless network system.

6. A handover method by a wireless terminal in a mobile communication network in which at least one or more heterogeneous wireless network systems are connected through a predetermined network, the method comprising:

detecting accessible wireless network systems and intensities of signals received from base stations of the accessible wireless network systems;

generating a message providing location information, including location information of a wireless terminal obtained based on information provided by a location recognition system, identifications of the detected wireless network systems and the intensity values of signals from the detected wireless network systems;

transmitting the message providing the location information to a location service server located in a common core network through a wireless network system selected on the basis of the intensities of signals of the detected wireless network systems;

receiving service area map information transmitted from the location service server, wherein the service area map information is set based on the message providing the location information;

selecting a wireless network system to move and then activating a unit for communicating with a base station of the selected wireless network system, if the mobile terminal is within the service area map;

the location server establishing the service area map information;

establishing a grid-shape map in which the interval of reference points varies with respect to each wireless network system;

receiving the message providing the location information from the wireless terminal, including the location information of the wireless terminal, an identifier of an accessible wireless network system, and the intensity of a signal received from a base station; and selecting a reference point closest to the location of the wireless terminal in relation to each of the wireless network systems, based on the location information of the wireless terminal, and storing the intensity of the signal at a location corresponding to the selected reference point;

detecting whether or not an already stored signal intensity value exists in relation to the reference point;

if the detection result indicates that the already stored signal intensity value does not exist, storing the intensity value of the signal included in the message providing the location information at the location corresponding to the selected reference point; and if the detection result indicates that the already stored signal intensity value exists, obtaining the average value between the already stored signal intensity value and the signal intensity value in the message providing the location information, and updating with the average value the location corresponding to the selected reference point.

7. The method of claim 6, wherein the determining of whether or not the location of the mobile terminal is within the service area map comprises:

the wireless terminal retrieving the current location information of the wireless terminal; and determining whether or not the location in the location information of the wireless terminal is in the service area map.

8. The method of claim 6, further comprising:

detecting a reception signal received by activating the communication unit for communication with the base station of the selected wireless network system, and determining whether or not the intensity of the detected reception signal is equal to or greater than a preset magnitude.

9. The method of claim 8, further comprising:

if the result of the determination indicates that the intensity of the reception signal is less than the preset magnitude, the wireless terminal inactivating the communication unit for communication with the base station for a predetermined time.

10. The method of claim 8, wherein the preset magnitude is an acceptable threshold of handover of the wireless terminal.

11. A location service server comprising:

a map storage unit generating and storing a grid-shape map in relation to each of wireless network systems forming a mobile communication network;

a reference point selection unit receiving from a wireless terminal a message providing location information, and intensity values of signals received from a base station of accessible wireless network systems and an identification of the accessible wireless network systems through a wireless network system selected from among the accessible wireless network systems on the basis of the intensities of signals of the accessible wireless network systems, searching the map storage unit, and selecting a reference point close to the location of the location information of the wireless terminal a signal intensity recording unit recording the signal intensity value at the selected reference point of the base station of each of the wireless network systems, wherein the signal intensity recording unit searches to detect the map storage unit whether or not an already stored signal intensity value exists in relation to the reference point, and if the detection result indicates that the already stored signal intensity value does not exist in relation to the reference point the signal intensity recording unit stores the intensity value of the signal in the message providing the location information, and if the detection result indicates that the already stored signal intensity value exists, the signal intensity recording unit obtains and stores the average value between the already stored signal intensity value and the signal intensity value in the message providing the location information.

12. The location service server of claim 11, further comprising:

an information processing unit transmitting service area map information stored in the map storage unit to the wireless terminal.

13. The location service server of claim 11, wherein the map storage unit forms the map in a grid-shape with predetermined intervals in each direction on a 2-dimensional plane and selects each position as the reference point.

* * * * *